United States Patent [19]

Marten

[11] 4,333,337

[45] Jun. 8, 1982

[54] METHOD FOR DETERMINING THE GASOLINE MILEAGE FOR A VEHICLE

[75] Inventor: John A. Marten, Wauconda, Ill.

[73] Assignee: Sun Electric Corporation, Crystal Lake, Ill.

[21] Appl. No.: 195,526

[22] Filed: Oct. 9, 1980

[51] Int. Cl.³ .................................................. G01F 9/00
[52] U.S. Cl. ..................................................... 73/114
[58] Field of Search .................. 73/116, 113, 114, 117

[56] References Cited

U.S. PATENT DOCUMENTS 3,613,438  10/1971  Esau .................................. 73/117 X
4,160,376   7/1979  Borkan ............................. 73/114 X Primary Examiner—Jerry W. Myracle
Attorney, Agent, or Firm—Allegretti, Newitt, Witcoff & McAndrews

[57] ABSTRACT

An improved method for determining the gasoline mileage of a vehicle is disclosed, wherein various test horsepower values, related to the vehicle and the specific test speeds, are determined and the vehicle is operated so as to deliver a horsepower substantially equal to the determined horsepower values during the test.

14 Claims, 1 Drawing Figure

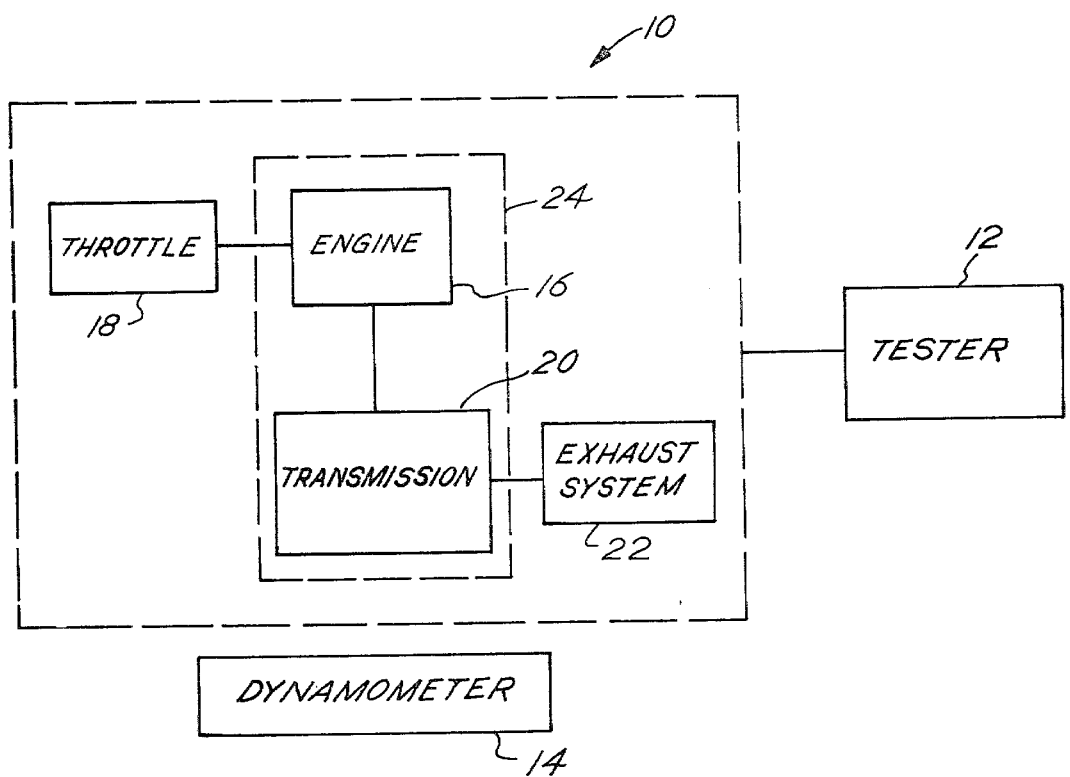

METHOD FOR DETERMINING THE GASOLINE MILEAGE FOR A VEHICLE

BACKGROUND OF THE INVENTION

The present invention relates generally to the testing of an internal combustion vehicle and more particularly to an improved method for determining the gasoline mileage or fuel economy of such a vehicle.

Presently, fuel economy measurements are performed on a dynamometer. A test apparatus is coupled to the fuel and/or exhaust system of the vehicle under investigation by transducers, and the vehicle is then operated under predetermined conditions, i.e., the vehicle is "driven" through a prescribed test cycle.

In terms of time and cost, the existing test cycle procedures are totally inappropriate for use in vehicle repair and service situations. For example, the test cycle of the EPA fuel economy procedure is far too extensive and complicated to be performed efficiently at the service and repair level. In other words, the length of test cycle and the equipment necessary to control the vehicles during the test (such that repeatable figures are obtained) simply cannot be justified at this level.

Further, the existing procedures fail to realistically forecast "on the road" mileage. Although the fuel economy numbers are reliable for purposes of comparison, the actual road mileage for a given vehicle is often substantially less than the predicted fuel economy.

The availability of realistic and readily ascertainable fuel economy figures is, however, particularly significant in the effort to reduce fuel consumption, and the lack of a simple and quick procedure for generating reliable figures has a serious adverse effect. First, it is difficult to advocate fuel-conscious driving techniques when the underlying support, i.e., the fuel economy figures, is erroneous and therefore unbelievable. Second, vehicle maintenance and repair are often proposed on the basis of improved fuel economy. Again, without reliable figures, the inducement to maintain and/or repair is substantially lessened.

SUMMARY OF THE INVENTION

In a principal aspect the present invention is an improved method for determining the gasoline mileage of a vehicle. The present invention provides repeatable ratings which approximate actual "on the road" mileage under the test conditions.

The focus of the present invention is the selection of a specified power output, or test horsepower value, at which the rating test is performed. The test is performed on a dynamometer at a single test speed to substantially avoid the inaccuracies inherent in a multiple speed test. After the specified power output is determined, the vehicle under investigation is accelerated to the test speed and that speed is substantially maintained by setting of the dynamometer. The operator adjusts the vehicle, or more particularly the throttle, such that the vehicle delivers a horsepower substantially equal to the specified test horsepower. Thereafter data acquisition is initiated.

For a low speed test condition, primarily reflecting a city driving rating, the improvement includes, in one aspect, determination of a base horsepower value related to vehicle weight, the test speed and an acceleration rate typical of city driving characteristics. This base horsepower value is then modified in accordance with the equipment of the vehicle, or more particularly the power train thereof, to provide the test horsepower value.

The vehicle is started and accelerated on the dynamometer to the test speed. The vehicle is then adjusted so as to deliver a horsepower substantially equal to the test horsepower value, previously determined. Monitoring of the vehicle and gathering of data follow.

For a cruising speed test condition, primarily reflecting a highway driving rating, two horsepower values are initially determined. The first is based upon the actual frontal area of the vehicle and the selected test speed. The second is based upon vehicle weight, test speed and an acceleration rate typical of highway driving characteristics.

The first and second horsepower values are added to provide the test horsepower value for the rating procedure. After acceleration of the vehicle to the test speed, the vehicle is adjusted to provide or deliver a horsepower substantially equal to the combined horsepower value. Monitoring is then initiated.

It is thus an object of the present invention to provide an improvement upon methods for determining the gasoline mileage of a vehicle. Another object is an improved method of determining fuel economy which is reliable and repeatable. A further object of the present invention is an improved fuel economy test procedure wherein the test conditions reveal common defects in the vehicle which influence fuel economy.

Still another object is to provide a mileage rating procedure such that maintenance and/or repair of a vehicle can be reliably substantiated in terms of improved fuel economy. It is also an object of the present invention to provide a reliable fuel economy measurement procedure whereby increased economy due to improved driving habits can be substantiated, so as to encourage efficient driving habits.

These and other objects, features and advantages of the present invention are set forth or apparent in the following detailed description.

BRIEF DESCRIPTION OF THE DRAWING

Various preferred embodiments of the present invention are described herein with reference to FIG. 1 wherein an internal combustion vehicle and a tester for monitoring the mileage and horsepower of the vehicle are schematically illustrated.

DETAILED DESCRIPTION OF A PREFERRED EMBODIMENT

The present invention is an improvement upon previously known methods of determining the gasoline mileage of an internal combustion vehicle, generally designated 10 in FIG. 1. This improved method is performed using a tester 12 coupled to the vehicle 10. During this test, the vehicle 10 is operated on a dynamometer 14.

The vehicle 10 includes an engine 16, a throttle 18, a transmission 20, and an exhaust system 22. The engine 16 and transmission 20 define the power train 24 of the vehicle 10, which will vary from vehicle to vehicle.

The tester 12 is preferably a Sun 1215 Computer II engine tester, including the Sun Electric MPG 40 miles per gallon option package. This tester is available through the Sun Electric Corporation of Chicago, Ill., and the operation manual therefor (as available on the execution date hereof) is incorporated herein by reference. With the "1215" tester 12, gasoline mileage and horsepower are determined by coupling the tester 12 to the engine 16 and operating the vehicle 10 on the dynamometer 14. The tester 12 gathers operational data, calculates the fuel economy and horsepower, and displays the results.

The dynamometer 14 is preferably the Sun Electric "RAM XI" dynamometer. This dynamometer 14 has constant speed control capability and also has the ability to display force, power and speed.

To determine the low speed gasoline mileage rating, representative of city driving, the present invention includes the steps of selecting a test horsepower value for the vehicle 10, operating the vehicle 10 at the test speed, setting the dynamometer 14 to control the test speed, and adjusting the vehicle 10 such that the horsepower delivered thereby substantially equals the test horsepower value. Data gathering is then initiated. The test horsepower value is based upon the vehicle weight, the power train 24, the test speed and a predetermined acceleration rate related to and typical of normal city driving characteristics.

In one preferred embodiment of the present invention, selection includes determination of a base horsepower value and modification thereof in accordance with the power train 24 to provide the test horsepower value. The base horsepower value is based upon and derived from the weight of the vehicle, the actual test speed and an acceleration rate related to typical city driving characteristics. The base horsepower value is calculated in accordance with the following equation:

$$HP = (TW \times AR \times MPH)/A$$

wherein HP, TW, AR, MPH and A represent the base horsepower value, the weight of the vehicle 10, the acceleration rate, the test speed, and a unit-justifying constant, respectively.

The weight of the vehicle, TW, is preferably the gross vehicle weight rating less the vehicle capacity plus three hundred (300) pounds. This represents a normal driver-only condition. The gross vehicle weight rating and the vehicle capacity are readily available weights, often shown on the vehicle "sticker."

The preferred test speed, most typical of city driving, is thirty (30) miles per hour. This preferred test speed is the limit commonly applied to city streets and therefore the normal speed of city traffic. For this test speed, the preferred acceleration rate is 2.18 miles per hour per second. This preferred rate is typical of city driving characteristics, as stated in the 1976 publication of the SAE Fuel Economy Task Force entitled "SAE Fuel Economy Measurement Procedures," incorporated herein by reference.

The preferred acceleration rate corresponds to the capacity of a vehicle 10 having the minimum power train 24. Many vehicles, however, have the capacity to exceed this minimum acceleration rate, and use of this capacity during city driving greatly influences fuel economy. The base horsepower value is therefore modified in accordance with the power train 24 to provide the test horsepower value. As a result, the test horsepower value is responsive not only to the vehicle weight but also to the power-to-weight ratio.

In modifying the base horsepower value, the vehicle 10 is initially assigned an acceleration factor. Preferably, the acceleration factors are 1–6, with "1" representing a minimum power train vehicle 10 and "6" representing the most powerful vehicle. In selecting the acceleration factor, the following general rules apply. If a particular vehicle type is available with several engine options then the lowest power model will be a "1". Typically a V8 or turbo-charged option will be "3". Luxury vehicles are normally "3" or "4", again depending on engine options, and sports cars would be "4" or "5". The acceleration factor "6" is used for only the most powerful high speed road cars which would be tested at 30 MPH in an indirect gear. These general rules are set forth and amplified below in Table 1:

TABLE 1

| VEHICLE TYPE | AF NO. |
| --- | --- |
| Standard 4 cylinder compact/midsize | 1 |
| Standard 6 cyclinder midsize/full size | 2 or 1 |
| Optional 6 cylinder for standard 4 cylinder | 2 |
| Optional 8 cylinder for standard 6 cylinder | 2 or 3 |
| Optional 8 cylinder for standard 4 cylinder | 3 or 4 |
| Luxury Sedans (standard 8 cylinder) | 3 or 4 |
| High Powered specialized sports cars | 5 or 6 |
| Turbocharger option | Add 2 to standard |
| Fuel injection or 4 Bbl | Add 1 to standard |
| Increased Engine Capacity | Add 1 or 2 to standard |
| Sports Coupes/Sports Cars | Add 1 or 2 to Sedan version |

With an acceleration factor of "1", the test horsepower value is equal to the base horsepower value. In this preferred embodiment, each incremental increase in the acceleration factor corresponds to a twenty (20) percent increase in the selected horsepower for the fuel economy test. For example, for an acceleration factor of "2", the calculated base horsepower value is increased 20%. Similarly the test horsepower value for an acceleration factor of "5" is 20% greater than the test horsepower value for an acceleration factor of "4".

The capacity of the vehicle 10 to accelerate is significant in the low speed fuel economy test because actual city driving provides many opportunities for rapid acceleration and deceleration. As noted below, the capacity to accelerate is far less significant in the cruising speed test as actual highway driving is substantially constant speed.

Once the test horsepower value is determined, the vehicle 10 is started and accelerated on the dynamometer 14 to the test speed. The dynamometer 14 is appropriately set to control the test speed. The throttle 18 of the vehicle 10 is then adjusted such that the actual horsepower delivered by the vehicle 10 at the test speed is substantially equal to the test horsepower value. Thereafter, data acquisition pertinent to calculation of the gasoline mileage rating is begun.

The conditions of the low speed test, i.e., low engine speed and substantially open throttle, reveal certain common vehicle defects which adversely effect fuel economy during city driving. These include primarily spark plug misfiring and improper operation of the carburetor power enrichment system.

The fuel economy figure derived from the low speed test represents gasoline mileage in a situation where acceleration (as opposed to constant speed) predominates. This fuel economy figure corresponds to the lower limit of the actual city driving mileage range, as experienced by the vehicle operator.

In the cruising speed test, representative of highway driving, the vehicle 10 is adjusted, prior to data acquisition, such that the delivered horsepower substantially equals a test horsepower value based upon actual frontal area and weight of the vehicle 10, the cruising test speed, and a predetermined acceleration rate related to typical highway driving characteristics. In one preferred embodiment, the test horsepower value is the total of a first and second horsepower value.

The first horsepower value is based upon a combination of the actual frontal area of the vehicle 10, a drag coefficient and the test speed. The nominal frontal area of the vehicle 10 is the product of height and width. The actual frontal area takes into account actual vehicle structure and is a percentage of nominal frontal area. The percentage is typically in the range of 60-90%.

Having determined the actual frontal area, the first horsepower value is calculated as follows:

$$FHP = [(MPH)^3 \times AFA \times DC]/B$$

wherein FHP, MPH, AFA, DC and B represent the first horsepower value, the test speed, the actual frontal area, a drag coefficient and a unit-justifying constant, respectively. The drag coefficient is in the range of 0.25–0.75.

The second horsepower value is derived from the equation used to determine the base horsepower value for the low speed test, i.e., $$SHP = (TW \times AR \times MPH)/A$$

However, in the cruising speed test, the preferred acceleration rate is approximately 0.218 miles per hour per second, which corresponds more closely to typical highway driving characteristics.

As in the low speed test, the conditions of the cruising speed test, i.e., part throttle and cruising engine speed, facilitate assessment of the engine components affecting highway fuel economy. Among these components are the carburetor, as it contributes to the air/fuel ratio, and the vacuum-controlled ignition timing advance devices.

The cruising speed test provides a fuel economy figure closely approximating actual cruising speed mileage under substantially ideal conditions. The figure therefore corresponds to the upper limit of attainable fuel economy for the vehicle 10, as operated at the cruising test speed.

The selection process of the present invention is greatly simplified by use of Charts 1-4, representing an accumulation of empirical data. With these charts, the present invention, as it relates to the low speed test, involves assigning a TW number and an AF number to the vehicle 10 under investigation, and determining the test horsepower value therefrom. The TW number is based upon the test weight of the vehicle 10, as shown in Chart 1. The AF number is the acceleration factor previously discussed. Once these assignments are made, the test horsepower is really ascertainable using Chart 2.

CHART 1

| WEIGHT Limits. lbw | TW No. |
|---|---|
| 1441–1728 | 3 |
| 1729–2074 | 4 |
| 2075–2488 | 5 |
| 2489–2986 | 6 |
| 2987–3583 | 7 |
| 3584–4300 | 8 |
| 4301–5160 | 9 |
| 5161–6192 | 10 |
| 6193–7430 | 11 |
| 7431–8916 | 12 |
| 8917–10,700 | 13 |
| 10,701–12,840 | 14 |

CHART 2
TEST HORSEPOWER
30 MPH

| TW No. | ACCELERATION FACTOR | | | | | |
|---|---|---|---|---|---|---|
| | 1 | 2 | 3 | 4 | 5 | 6 |
| 3 | 13 | 15 | 18 | 22 | 26 | 32 |
| 4 | 15 | 18 | 22 | 26 | 32 | 38 |
| 5 | 18 | 22 | 26 | 32 | 38 | 45 |
| 6 | 22 | 26 | 32 | 38 | 45 | 54 |
| 7 | 26 | 32 | 38 | 45 | 54 | 65 |
| 8 | 32 | 38 | 45 | 54 | 65 | 78 |
| 9 | 38 | 45 | 54 | 65 | 78 | 94 |
| 10 | 45 | 54 | 65 | 78 | 94 | 112 |
| 11 | 54 | 65 | 78 | 94 | 112 | |
| 12 | 65 | 78 | 94 | 112 | | |
| 13 | 78 | 94 | 112 | | | |
| 14 | 94 | 112 | | | | |

| AREA Limits. ft² | AR No. |
|---|---|
| 19.2–21.1 | 3 |
| 21.2–23.2 | 4 |
| 23.3–25.5 | 5 |
| 25.6–28.1 | 6 |
| 28.2–30.9 | 7 |
| 31.0–34.0 | 8 |
| 34.1–37.5 | 9 |
| 37.6–41.3 | 10 |
| 41.4–45.2 | 11 |
| 45.3–49.7 | 12 |
| 49.8–54.6 | 13 |
| 54.7–60.2 | 14 |
| 60.3–66.2 | 15 |
| 66.3–72.8 | 16 |
| 72.9–80.1 | 17 |

Chart 4
Test Horsepower
55 MPH

| AR No. | TW NO. | | | | | | | | | | | |
|---|---|---|---|---|---|---|---|---|---|---|---|---|
| | 3 | 4 | 5 | 6 | 7 | 8 | 9 | 10 | 11 | 12 | 13 | 14 |
| 3 | 9 | 10 | 10 | 11 | 12 | 13 | | | | | | |
| 4 | 10 | 11 | 11 | 12 | 13 | 14 | | | | | | |
| 5 | 11 | 12 | 12 | 13 | 14 | 15 | 16 | | | | | |
| 6 | | 13 | 13 | 14 | 15 | 16 | 17 | 18 | | | | |
| 7 | | | 14 | 15 | 16 | 17 | 18 | 19 | 21 | | | |
| 8 | | | | 16 | 17 | 18 | 19 | 20 | 22 | | | |
| 9 | | | | | 18 | 19 | 20 | 21 | 23 | 25 | | |
| 10 | | | | | | 21 | 22 | 23 | 25 | 27 | 29 | |
| 11 | | | | | | | 23 | 24 | 26 | 28 | 30 | 33 |
| 12 | | | | | | | 25 | 26 | 28 | 30 | 32 | 35 |
| 13 | | | | | | | | 28 | 30 | 32 | 34 | 37 |
| 14 | | | | | | | | 30 | 32 | 34 | 36 | 39 |
| 15 | | | | | | | | 32 | 34 | 36 | 38 | 41 |
| 16 | | | | | | | | | 36 | 38 | 40 | 43 |
| 17 | | | | | | | | | 39 | 41 | 43 | 46 |

In the cruising speed test, the vehicle 10 is assigned a TW number (using Chart 1) and an AR, or air resistance, number (using Chart 3). The AR number is derived using nominal frontal area. The test horsepower is then derived from Chart 4.

In practice, the present invention is particularly useful in substantiating the need for and cost of maintenance or repair of a vehicle 10. Low and cruising speed rating tests are performed before and after the maintenance and/or repair. The improvement in rating shown thereby is directly attributable to the maintenance or repair.

The present invention integrates the various parameters affecting fuel economy, at both low and cruising speeds, into a single speed, single power output test. Such a test is highly suited for use at the repair and service level to quickly and easily provide fuel economy figures.

Various preferred embodiments of the present invention have been described herein. It is to be understood that changes and modifications can be made without departing from the time scope and spirit of the present invention, as defined by the following claims.

We claim:

1. In a method for determining a gasoline mileage rating for a vehicle of the type wherein said vehicle is operated on a dynamometer at a city driving speed and monitored to provide data sufficient to calculate said gasoline mileage rating therefrom, said vehicle having a weight, a predetermined driveline, and delivering a horsepower during operation at said city driving speed, the improvement comprising the steps of:
   (a) selecting a test horsepower value for said vehicle based upon said weight, said predetermined driveline, said city driving speed and a predetermined acceleration rate related to typical city driving characteristics;
   (b) starting said vehicle and accelerating said vehicle to said city driving speed;
   (c) setting said dynamometer to maintain said city driving speed;
   (d) adjusting said horsepower delivered by said vehicle to substantially equal said test horsepower value; and
   (e) then initiating said monitoring of said vehicle.

2. The improvement as claimed in claim 1 wherein selection of said test horsepower value includes determining a base horsepower value related to said weight, said city driving speed and said predetermined acceleration rate.

3. The improvement as claimed in claim 2 wherein selection of said test horsepower value further includes modifying said base horsepower value based upon said driveline to provide said test horsepower value.

4. The improvement as claimed in claim 2 wherein said base horsepower value is determined in accordance with the following equation:

$$HP = (TW \times AR \times MPH)/A$$

wherein HP represents said base horsepower value, TW represents said weight of said vehicle, AR represents said predetermined acceleration rate, MPH represents said city driving speed, and A is a unit-justifying constant.

5. The improvement as claimed in claim 4 wherein said predetermined acceleration rate is approximately 2.18 miles per hour per second.

6. The improvement claimed in claim 1 wherein said city driving speed is approximately thirty miles per hour.

7. The improvement as claimed in claim 1 wherein selection of said test horsepower value includes assigning a TW number and an AF number to said vehicle, said TW number and said AF number having a predetermined relationship to said test horsepower value.

8. In a method for determining a gasoline mileage rating for a vehicle of the type wherein said vehicle is operated on a dynamometer at a cruising speed and monitored to provide data sufficient to calculate said gasoline mileage rating therefrom, said vehicle having an actual frontal area, a weight and delivering a horsepower during operation at said cruising speed, the improvement comprising the steps of:
   (a) selecting a test horsepower value for said vehicle based upon said actual frontal area, said weight, said cruising speed and a predetermined acceleration rate related to typical highway driving characteristics;
   (b) starting said vehicle and accelerating said vehicle to said cruising speed;
   (c) setting said dynamometer to maintain said cruising speed;
   (d) adjusting said horsepower delivered by said vehicle to substantially equal said test horsepower value; and
   (e) then initiating said monitoring of said vehicle.

9. The improvement as claimed in claim 8 wherein selection of said test horsepower value includes:
   (a) determining a first horsepower value for said vehicle based upon said highway speed and said actual frontal area;
   (b) determining a second horsepower value for said vehicle based upon weight, said highway speed, and a predetermined acceleration rate related to typical highway driving characteristics; and
   (c) adding said first horsepower value and said second horsepower value to provide said test horsepower value.

10. The improvement as claimed in claim 9 wherein said first horsepower value is determined in accordance with the following equation:

$$FHP = [(MPH)^3 \times AFA \times DC]/A$$

wherein FHA represents said first horsepower value, MPH represents said cruising speed, AFA represents said actual frontal area, DC represents a predetermined drag coefficient, and A is a unit-justifying constant.

11. The improvement as claimed in claim 9 wherein said second horsepower value is determined in accordance with the following equation:

$$SHP = (TW \times AR \times MPH)/A$$

wherein SHP represents said second horsepower value, TW represents said weight, AR represents said predetermined acceleration rate, MPH represents said cruising speed, and A is a unit-justifying constant.

12. The improvement as claimed in claim 11 wherein said predetermined acceleration rate is approximately 0.218 miles per hour per second.

13. The improvement as claimed in claim 8 wherein said cruising speed is approximately fifty-five miles per hour.

14. The improvement as claimed in claim 8 wherein selection of said test horsepower value includes assigning a TW number and an AR number to said vehicle, said TW number and said AR number having a predetermined relationship to said test horsepower value.

* * * * *